United States Patent [19]

Hau et al.

[11] Patent Number: 4,545,264
[45] Date of Patent: Oct. 8, 1985

[54] AUTOMATIC DIFFERENTIAL TRANSMISSION GEAR

[75] Inventors: Antonín Hau; Jirí Srubar, both of Prague, Czechoslovakia; Jurij K. Esenovskij-Laškov; Olgert I. Giruckij, both of Moskva, U.S.S.R.

[73] Assignee: Ustav pro vyzkum motorovych vozidel, Prague, Czechoslovakia

[21] Appl. No.: 418,587

[22] Filed: Sep. 15, 1982

[30] Foreign Application Priority Data

Sep. 15, 1981 [CS] Czechoslovakia ............... 6810-81

[51] Int. Cl.[4] .......................................... F16H 47/08
[52] U.S. Cl. ................................. 74/688; 74/730
[58] Field of Search ............... 192/87.1, 87.11, 87.12, 192/87.13, 52, 3.25, 3.27, 3.28, 3.29, 3.31, 3.32; 74/730, 766, 677, 688

[56] References Cited

U.S. PATENT DOCUMENTS

| | | | |
|---|---|---|---|
| 2,077,487 | 4/1937 | Lyman | 192/48.92 |
| 3,048,057 | 8/1962 | Dodge | 74/688 |
| 3,270,585 | 9/1966 | Livezey | 74/688 |
| 3,542,174 | 11/1970 | Hattori | 192/3.31 |
| 3,566,998 | 3/1971 | Honda | 192/3.31 |
| 3,903,757 | 9/1975 | Hau et al. | 74/688 |
| 4,018,106 | 4/1977 | Uozumi et al. | 74/688 |

FOREIGN PATENT DOCUMENTS 2839232 4/1979 German Democratic Rep. ................... 192/3.29

Primary Examiner—Allan D. Herrmann
Assistant Examiner—Shirish Desai

[57] ABSTRACT

Automatic differential transmission gear particularly suitable for motor vehicles comprising a speed reducing gear box with a reduction planetary gear and a collecting planetary gear. The gear box has two input shafts, one of which is connected with the reduction planetary gear and the second of which is connected with the collecting planetary gear. In one preferred embodiment, the input shaft of the reduction planetary gear is selectively connected firmly or by way of a hydrodynamic element with the input shaft of the automatic differential transmission gear, and the input shaft of the collecting planetary gear is adapted to be connected with the input shaft of the automatic differential transmission gear by a connecting element in the form of two friction clutches. The first clutch is firmly connected with the input shaft of the collecting planetary gear, and the second clutch is firmly connected to the input shaft of the collecting planetary gear, the second clutch is connected to the input shaft of the collecting planetary gear by a selectively operated freewheel device.

5 Claims, 6 Drawing Figures

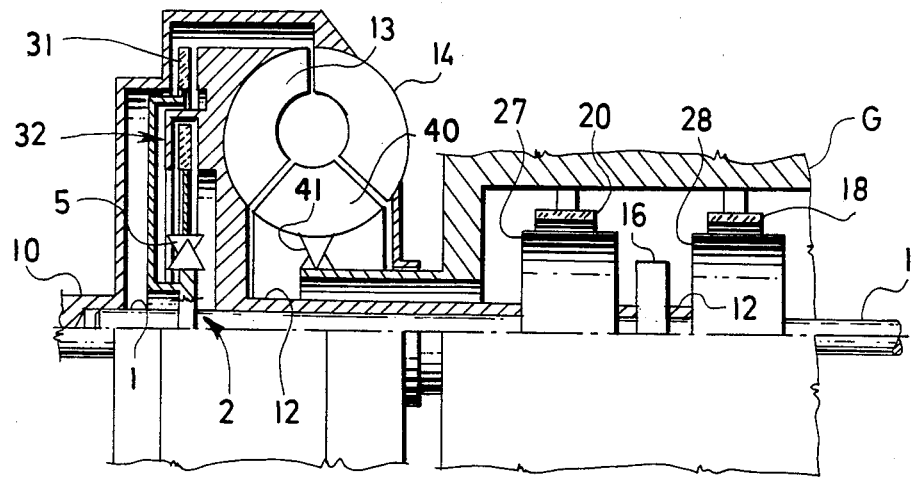
FIG. 1
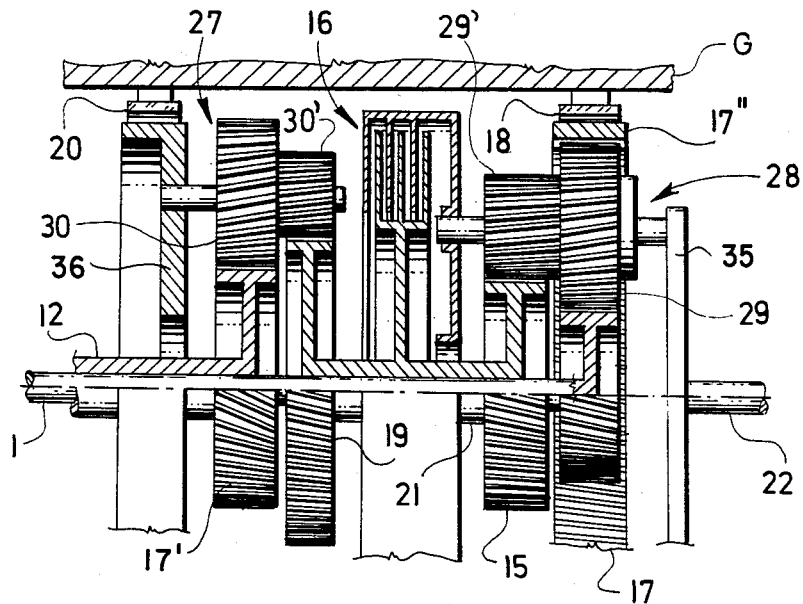
FIG. 2a
| | | SPACE 23 | SPACE 24 | CLUTCH 16 | BRAKE 20 | BRAKE 18 |
|---|---|---|---|---|---|---|
| Z | | − | + | − | + | + |
| N | | − | + | − | − | − |
| 1° | | + | + | − | − | + |
| 2° | | − | + | + | + | − |
| 3° | A | + | + | − | + | − |
|    | B |   | − |   |   |   |
| 4° | A | + | + | + | − | − |
|    | B |   | − |   |   |   |
FIG. 5

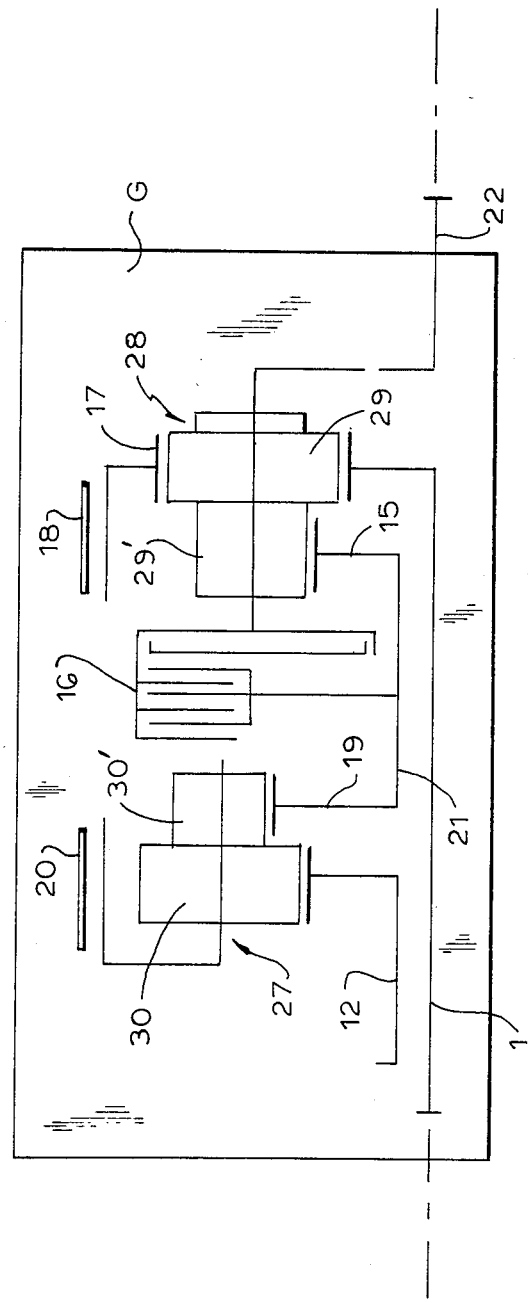

AUTOMATIC DIFFERENTIAL TRANSMISSION GEAR

BACKGROUND OF THE INVENTION

This invention relates to an automatic differential transmission gear comprising a gear box with a reduction planetary gear and a collecting planetary gear, there being two input shafts to the gear box, one of which is connected to the reduction gear and the second of which is connected to the collecting planetary gear, an output shaft of the transmission gear and an input shaft of the transmission gear. The input shaft of the reduction planetary gear is connected firmly or alternatively by way of a hydrodynamic element with the input shaft of the transmission gear, and the input shaft of the collecting planetary gear can be connected to the input shaft of the transmission gear through a connecting element. This invention is an improvement upon that disclosed in coassigned U.S. Pat. No. 3,903,757 to Hau et al, of Sept. 9, 1975.

Known automatic transmission gears deleteriously affect the rate of consumption of fuel of mechanisms in which they are incorporated such as motor vehicles. There is a trend toward the provision of an automatic transmission gear which permits a reduction of fuel consumption in comparison with automobiles with a classical manually operated transmission gear. Such automatic transmission gear, however, leads to the further complication of automatic transmission gears, and thus makes it difficult to employ them in cheaper automobiles.

SUMMARY OF THE INVENTION

It is an object of this invention to provide an automatic differential transmission gear permitting a reduction of fuel consumption of the engine connected therewith, such transmission gear also having a low number of gear shifting elements whereby there is the possibility of providing an increased number of transmission stages or speeds.

These objects are accomplished with the differential automatic transmission gear according to the present invention. In such transmission gear there is provided a connecting element between the input shaft of the collecting planetary gear and the input shaft of the transmission gear, such connecting element being in the form of two friction clutches, the first clutch being firmly connected with the input shaft of the collecting planetary gear and the second friction clutch being connected thereto by means of a freewheel device. The input shaft of the collecting planetary gear is connected with the sun gear of the collecting planetary gear, and the input shaft of the reduction planetary gear is connected with the sun gear of the reduction planetary gear, the sun gears of the reduction and collecting planetary gears being connected by an interconnecting shaft. The friction clutches comprise clutch plates arranged on a common carrier which is non-rotatably supported by the input shaft of the collecting planetary gear and have two supporting arms, on the first of which there is arranged the clutch plate of the first friction clutch, and on the second supporting arm there is arranged a clutch plate of the second friction clutch, the second supporting arm being connected with the common carrier through a freewheel device. The clutch plate of the first friction clutch is arranged between a bearing surface which is fixed with respect to the input shaft of the transmission gear and between a supporting piston which is non-rotatably arranged on a carrier which is firmly connected with the input shaft of the reduction planetary gear. The clutch plate of the second friction clutch is arranged between an inserted piston slidably arranged in the supporting piston and a bearing element firmly connected with the supporting piston. The carrier of the supporting piston forms the external part of the turbine of the hydrodynamic element, the impeller of which is firmly connected with the input shaft of the transmission gear.

Advantages of the automatic differential transmission gear according to this invention are the larger number of transmission stages or speeds which it can provide, its relative simplicity of construction, the possibility of locking the freewheel according to the wishes of the driver, and the possibility of achieving a significant reduction of the fuel consumption of the motor vehicle in which the transmission gear of the invention is incorporated.

DESCRIPTION OF DRAWINGS

Exemplary embodiments of automatic differential transmission gears in accordance with the invention are shown in the attached drawings, wherein:

FIG. 1 is a diagrammatic view of an entire automatic differential transmission gear in accordance with a first embodiment thereof;

FIG. 2 is a diagrammatic illustration of the gear box of the transmission gear of FIG. 1;

FIG. 2a is a fragmentary view in axial section of the gear box of the transmission gear illustrated in FIG. 2.

FIG. 5 is a table showing the connections of various ones of the elements of the transmission gear of the invention when it is operating at different stages or speeds of transmission of rotary motion therethrough.

DESCRIPTION OF PREFERRED EMBODIMENTS

Figure 3:
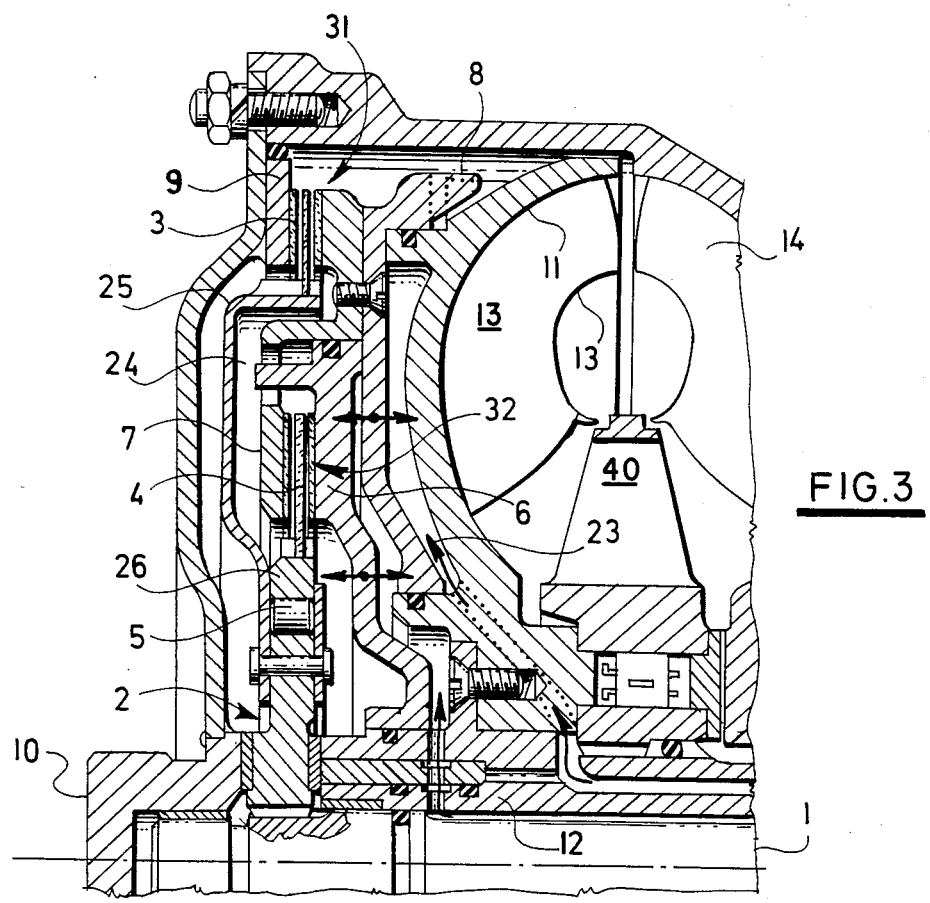
FIG. 3 is a fragmentary view partially in axial section and partially in side elevation of the input end of the transmission gear of FIG. 1.

Turning first to FIGS. 1, 2 and 3, which illustrate a first preferred embodiment of the transmission gear of the invention, such transmission gear has an input shaft 10 which is firmly connected with the impeller 14 of a hydrodynamic element in the form of a hydraulic torque converter which also has a turbine 13 and a stator reactor 40. The turbine 13 is connected with the input shaft 12 of a reduction planetary gear mechanism 27. The reactor 40 is mounted via an overrunning clutch 41 upon a fixed part of the transmission casing as indicated in FIG. 1. Mechanism 27 and a collecting planetary gear mechanism 28 are contained in a gear box G. The input shaft 1 of the collecting planetary gear 28 is connected with a carrier 2, on which a first friction clutch 31 is arranged and, through a freewheel device 5, a second friction clutch 32. The input shaft 1 of the collecting planetary gear 28 is connected with a first central or sun gear 17 of mechanism 28, and the input shaft 12 of the reduction planetary gear mechanism 27 is connected with a first central or sun gear 17' of the reduction planetary gear mechanism 27. Gear mechanisms 27 and 28 are of generally the same construction as mechanisms 33 and 34, respectively, in the apparatus of the above-cited U.S. Pat. No. 3,903,757.

The reduction planetary gear mechanism 27 has a second central or sun gear 19 which is connected through an interconnecting shaft 21 with the second central or sun gear 15 of the collecting planetary gear mechanism 28. The interconnecting shaft 21 is also firmly connected with one part of the clutch 16, the second part of which is connected with a satellite carrier 35 of the collecting planetary gear 28. Such carrier 35 of the collecting planetary gear 28 is connected with the output shaft 22 of the transmission gear as a whole. The twin satellites 29 and 29' of the collecting planetary gear mechanism 28 engage the sun gear 15 of such mechanism and the ring gear 17" thereof, respectively, which can be connected with the frame of the transmission gear box G by a brake 18. The carrier 36 of the reduction planetary gear mechanism 27, supporting the twin satellites 30, 30', is connected with the frame of the transmission gear box G by a brake 20.

As shown in FIG. 3, the input shaft 10 of the transmission gear is connected with the carrier 11 through the hydrodynamic mechanism 13, 14, 40. A supporting piston 8 is slidingly supported in the carrier 11. The carrier 11 is firmly connected with the input shaft 12 of the reduction planetary gear mechanism 27. The carrier 2 comprises a first supporting arm 25 and a second supporting arm 26 for supporting the clutch plates 3 and 4 of the first and second friction clutches 31 and 32, respectively. The clutch plate 3 of the first friction clutch 31 is arranged between a bearing surface 9 which is fixed with respect to the input shaft 10 of the transmission gear and between the supporting piston 8 which is non-rotatably arranged on the carrier 11. The space between piston 8 and carrier 11 is connected to atmosphere, and is employed in the operation of the transmission gear. The clutch plate 4 of the second friction clutch 32 is arranged between an inserted piston 6 which is slidingly supported in the supporting piston 8, and a bearing element 7 firmly connected to the supporting piston 8. The inserted piston 6 and the supporting piston 8 are controlled by liquid under pressure which is supplied to the spaces 23 and 24, respectively.

Figure 4:
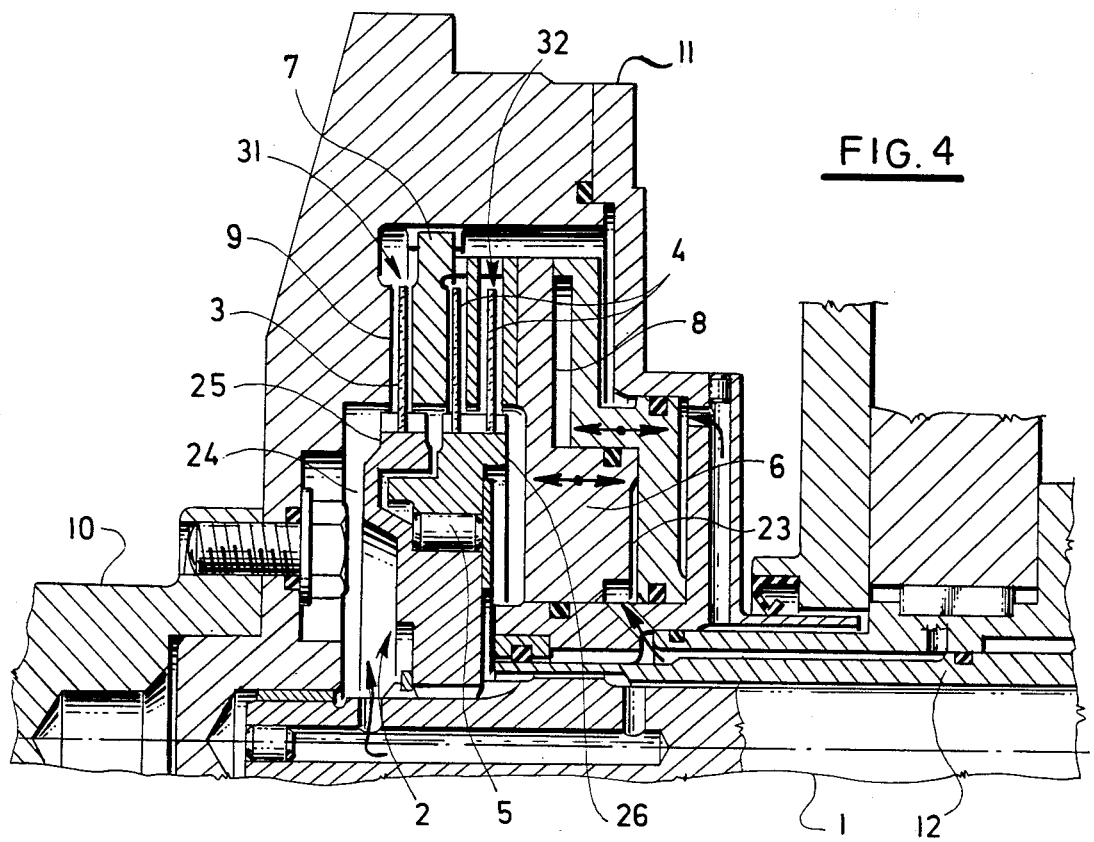
FIG. 4 is a view similar to FIG. 3 of the input part of a second embodiment of transmission gear in accordance with the invention.

In the embodiment of FIG. 4 the same reference characters are employed to designate parts which are the same as or similar to those shown in FIGS. 1, 2 and 3. In this embodiment the clutch plates 3 and 4 are all of the same diameter and are arranged at the same radial distance from the axis of the hydrodynamic transmission element, in contrast to the location of the similar clutches at different distances radially from the axis of the hydrodynamic transmission element. In all other respects the manner of operation of the mechanism of FIG. 4 is similar to that of the mechanism shown in FIGS. 1, 2 and 3 and described above with the exception that no hydrodynamic driving mechanism is employed therein, and that the shaft 10 is firmly connected with the shaft 12.

In the table which constitutes FIG. 5 the symbols therein have the following meaning:
+ supply of pressure oil to the respective control element,
− zero pressure of oil at the respective element,
z rear movement,
N neutral,
1° first transmission stage,
2° second transmission stage,
3° third transmission stage,
4° fourth transmission stage,
A condition where the freewheel is not locked,
B condition where the freewheel is locked.

When the first stage of the transmission is to be activated, pressure oil is supplied to the right of the inserted piston 6 into space 23, and into the space 24, to the left of the supporting piston 8. The supporting piston 8 is urged into its extreme right position, the clutch plate 3 is disengaged, the inserted piston 6 is urged to the left, clutch plates 4 are closed, torque is transmitted from the input shaft 10 of the transmission gear through the carrier 11, the inserted piston 6, clutch plates 4, freewheel 5, carrier 2, input shaft 1, to the collecting planetary gear 28 and, in case brake 18 is applied, brake 18 from the carrier of collecting planetary gear 28 to the output shaft 22 of the transmission gear. By release of pressure fluid from space 24, both pistons 6 and 8 are urged to the left, the clutch plate 3 is also closed, and the freewheel device 5 is locked.

When cutting in the second stage, pressure oil is supplied to the left of the pistons 6 and 8 into space 24, both pistons 6 and 8 are urged to the right, and the clutch plates 3 and 4 are released. Power is transmitted from the input shaft 10 through the carrier 11 and the input shaft 12 to the reduction planetary gear 27, when brake 20 is applied to the interconnecting shaft 21 and through the closed clutch 16 to the output shaft 22 of the transmission gear.

When cutting in the third transmission stage, pressure oil is supplied to the right of the inserted piston 6 into space 23, and to the left of pistons 6 and 8 into space 24. The clutch plates 4 are closed, the clutch plates 3 are disengaged, and power is transmitted from the input shaft 10 of the transmission gear through carrier 11, inserted piston 6, clutch plates 4, freewheel device 5, carrier 2, and input shaft 1 to the collecting planetary gear 28 and simultaneously from the carrier 11 through the input shaft 12 to the reduction planetary gear 27 and, when brake 20 is applied, through the interconnecting shaft 21 to the collecting planetary gear 28 and, after the collecting planetary gear 28 has added the torques of both shafts 1 and 21, to the output shaft 22 of the transmission gear. By the discharge of pressure oil from space 24, both pistons 6, 8 are urged to the left, all clutch plates 3 and 4 are closed, and the freewheel device 5 is locked. With the arrangement shown in FIG. 3 the hydrodynamic converter is simultaneously locked.

When cutting in the fourth transmission stage, the first part of the transmission gear acts just as it does in the third transmission stage including the locking of the freewheel device 5 and the locking of the hydrodynamic converter; in the gear box G the clutch 16 is closed and the brake 20 is disengaged. Power is transmitted from the input shaft 10 of the transmission gear through carrier 11, inserted piston 6, clutch plates 4, eventually through clutch plates 3, freewheel device 5, carrier 2, input shaft 1 of the collecting planetary gear mechanism 28, and the locked collecting planetary gear mechanism 28 to the output shaft 22 of the transmission gear.

In case of reversal or rearward movement of the vehicle, pressure oil is supplied to space 24, both pistons 6 and 8 are urged to the right, all clutch plates 3 and 4 are disengaged, power is transmitted from the input shaft 10 of the transmission gear through the carrier 11, input shaft 12 to the reduction planetary gear 27, brake 20 being applied through the interconnecting shaft 21, to the collecting planetary gear mechanism 28, and, when brake 18 is applied to the output shaft 22 of the transmission gear, which now turns in the direction which is opposite that from in which it turns in stages 1-4, inclusive.

Although the invention is illustrated and described with reference to a plurality of embodiments thereof, it is to be expressly understood that it is in no way limited to the disclosure of such preferred embodiments but is capable of numerous modifications within the scope of the appended claims.

We claim:

1. Automatic differential transmission gear comprising a speed reducing gear box with a reduction planetary gear and a collecting planetary gear, the gear box having a first and a second input shaft, the first input shaft being connected with the reduction planetary gear, the second input shaft being connected with the collecting planetary, the automatic differential transmission gear having an output shaft and an input shaft the input shaft of the reduction planetary gear being connected with the input shaft of the transmission gear, the input shaft of the collecting planetary gear being adapted to be selectively connected with the input shaft of the automatic differential transmission gear by means of a connecting element, said connecting element between the input shaft of the collecting planetary gear and the input shaft of the automatic differential transmission gear comprising two friction clutches, the first friction clutch being connected with the input shaft of the collecting planetary gear so as to take part in its rotational movement, and the second friction clutch being connected with the input shaft of the collecting planetary gear by way of a selectively operated freewheel device, said first first friction clutch comprising a plate arranged between a bearing surface fixedly attached to the input shaft of the gear, and a bearing element fixedly attached to a supporting piston mounted in a carrier, while the second friction clutch comprises a plate arranged between the bearing element and an inserted piston mounted in said bearing element.

2. Automatic differential transmission gear as in claim 1, wherein each of the reducing planetary gear and the collecting planetary gear has two sun gears, the input shaft of the collecting planetary gear is connected with the first sun gear of the collecting planetary gear, the input shaft of the reduction planetary gear is connected with the first sun gear of the reduction planetary gear, and the second sun gears of the reduction and collecting planetary gears are connected by an interconnecting shaft.

3. Automatic differential transmission gear as in claim 1, comprising a first carrier arranged on the input shaft of the collecting planetary gears so as to take part in its rotational movement, the first carrier being provided with two supporting arms, the first supporting arm being connected firmly with the carrier, the second supporting arm being connected with the first carrier by way of a selectively operable freewheel device, the clutch plate of the first friction clutch being arranged on the first supporting arm, and the clutch plate of the second friction clutch being arranged on the second supporting arm.

4. Automatic differential transmission gear as in claim 3, comprising a second carrier connected firmly with the input shaft of the reduction planetary gear, a supporting piston arranged on said second carrier so as to take part in its rotational movement, an inserted piston slidingly arranged within said supporting piston, a bearing surface fixed with respect to the input shaft of the automatic differential transmission gear, a bearing element firmly connected with said supporting piston, a clutch plate of the first friction clutch being arranged between the bearing surface which is fixed with respect to the input shaft of the automatic differential transmission gear and said supporting piston, a clutch plate of the second friction clutch being arranged between said inserted piston and said bearing element which is firmly connected with the supporting piston.

5. Automatic differential transmission gear as in claim 3, comprising a hydrodynamic element interposed between the input shaft of the reduction planetary gear and the input shaft of the transmission gear, said hydrodynamic element comprising an impeller and a turbine, a second carrier connected with the input shaft of the automatic differential transmission gear, a supporting piston arranged on said second carrier so as to take part in its rotational movement, said second carrier forming the external part of said turbine, and said impeller being firmly connected with the input shaft of the automatic differential transmission gear.

* * * * *